United States Patent [19]
Cherukuri et al.

[11] Patent Number: 5,980,719
[45] Date of Patent: Nov. 9, 1999

[54] ELECTROHYDRODYNAMIC RECEPTOR

[75] Inventors: Satyam C. Cherukuri, Cranbury; Aaron W. Levine; Sterling E. McBride, both of Lawrenceville, all of N.J.; Pamela K. York, Yardley, Pa.

[73] Assignee: Sarnoff Corporation, Princeton, N.J.

[21] Appl. No.: 08/937,817

[22] Filed: Sep. 29, 1997

Related U.S. Application Data

[60] Provisional application No. 60/046,293, May 13, 1997.

[51] Int. Cl.$^6$ .................................................. G01N 27/26
[52] U.S. Cl. .......................... 204/600; 347/20; 347/55; 422/50; 204/601
[58] Field of Search ........................... 347/20, 29, 40, 347/41, 44, 55, 42; 422/50, 99, 100, 129; 204/451, 450, 600, 601

[56] References Cited

U.S. PATENT DOCUMENTS

| | | | |
|---|---|---|---|
| 4,364,059 | 12/1982 | Nagayama | 347/89 |
| 4,596,990 | 6/1986 | Hou | 347/41 |
| 4,631,548 | 12/1986 | Milbrandt | 347/15 |
| 5,657,062 | 8/1997 | Shiraishi et al. | 347/55 |
| 5,726,026 | 3/1998 | Wilding et al. | 435/7.21 |
| 5,872,010 | 2/1999 | Karger et al. | 436/173 |

OTHER PUBLICATIONS

Electro–osmosis entry in "A dictionary of electrochemistry", John Wiley & Sons, New York, Davies et al., 1977. Month unavailable.

Fuhr et al. ("Travelling wave–driven microfabricated electrohydrodynamic pumps for liquids ", J. Micromech. Microeng. 4 (1994) 217–226)., 1994. month unavailable.

*Primary Examiner*—William H. Beisner
*Assistant Examiner*—Alex Noguerda
*Attorney, Agent, or Firm*—William J. Burke

[57] ABSTRACT

An electrohydrodynamic (EHD) receptor that incorporates microchannels and reservoir(s) for selectively dispensing fluid from the reservoir(s) to a specific location, e.g., onto the surface of the receptor.

28 Claims, 12 Drawing Sheets

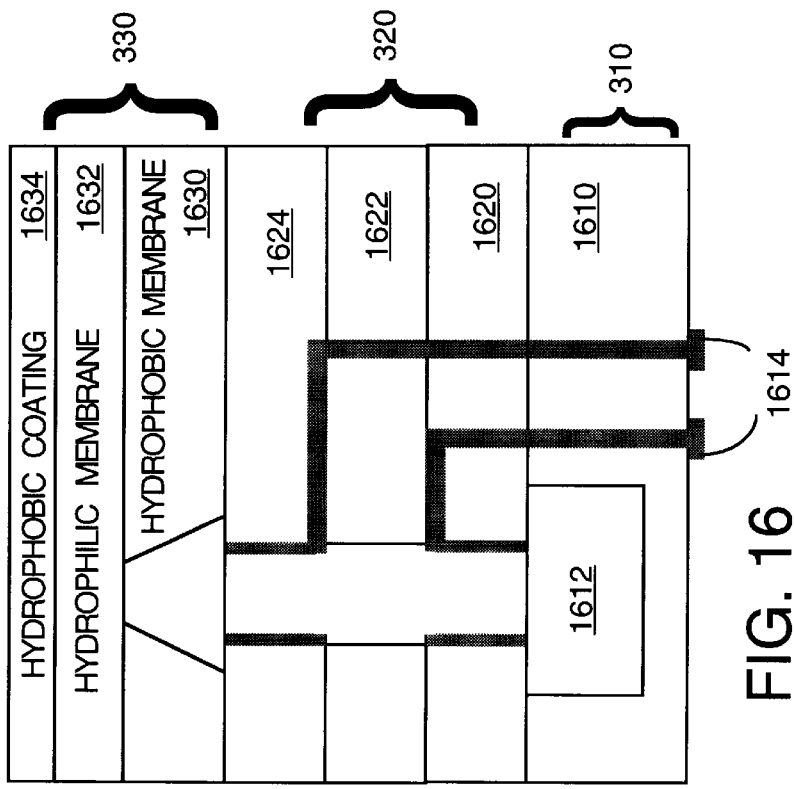
FIG. 16
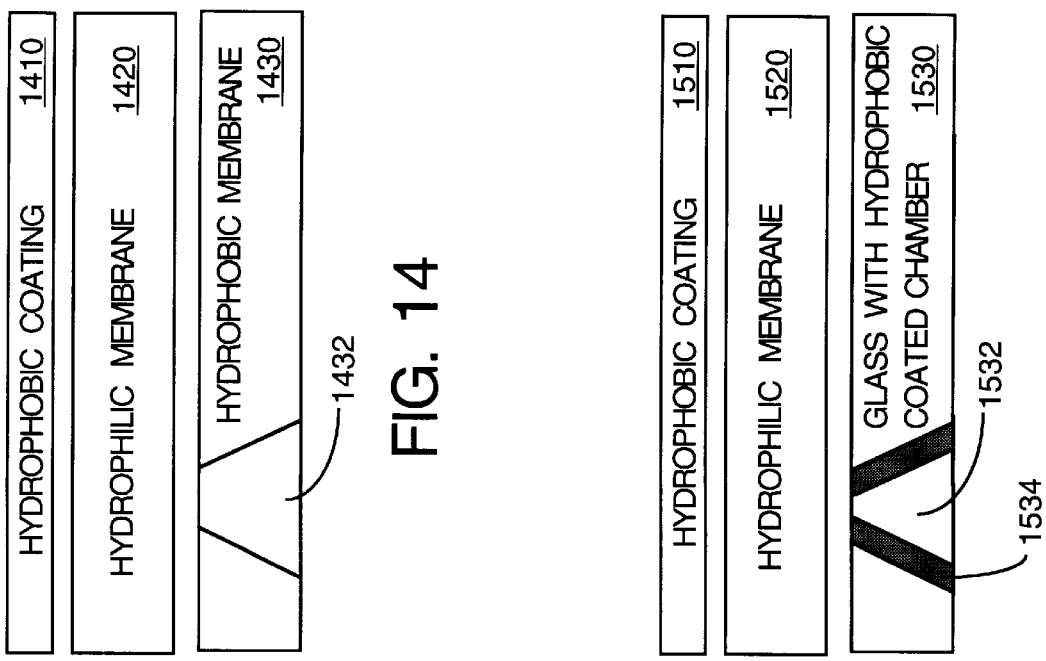
FIG. 14
FIG. 15

ELECTROHYDRODYNAMIC RECEPTOR

This application claims the benefit of U.S. Provisional Application No. 60/046,293 fled May 13, 1997.

The invention relates to an electrohydrodynamic (EHD) receptor and, more particularly, the invention relates to a multilayer receptor that incorporates microchannels and reservoir(s) for selectively dispensing fluid from the reservoir(s) to a specific location, e.g., onto the surface of the receptor.

BACKGROUND OF THE DISCLOSURE

The ability to reduce the size of an object is typically an important advance in different fields of technology, where such reduction increases efficiency, reduces cost and promotes portability, as evident by the success of traditional semiconductor techniques. In response, different industries have incorporated and modified various semiconductor techniques to reduce the size and cost of different products, e.g., various fluid delivery systems.

One example is the field of microfluidic devices and methods as disclosed in U.S. Pat. No. 5,585,069 (Partitioned Microelectronic And Fluidic Device Array For Clinical Diagnostics And Chemical Synthesis) and U.S. Pat. No. 5,603,351 (Method And System For Inhibiting Cross-Contamination In Fluids Of Combinatorial Chemistry Device), which are incorporated herein by reference. These devices provide arrays having micron sized reservoirs and channels for delivery of a very small amount of fluids to a specific location, e.g., a receptor or reaction cell on the array.

Another example is the field of inkjet printing which applies the traditional semiconductor techniques in the design of inkjet printhead. Nozzles on the printhead can be formed using traditional laser or other etching processes. Typically, the inkjet printhead incorporates heating elements or piezoelectric drivers to heat or to perturbate acoustically ink drops onto a receptor, e.g., a piece of paper.

However, such fluid devices are often components of a much larger system or they must be manipulated or serviced by a larger system to perform their primary function, which is the delivery of fluids to a receptor. For example, the printhead must reside within a printer. This limitation significantly reduces the portability of the device.

Therefore, a need exists in the art for a portable receptor that incorporates microchannels and reservoir(s) for selectively dispensing fluid(s) from the reservoir(s) to a specific location, e.g., onto the surface of the receptor.

SUMMARY OF THE INVENTION

The present invention is a method and apparatus for incorporating EHD micropumps, microchannels and reservoir(s) for selectively dispensing fluid(s) from the reservoir(s) to a specific location on the apparatus. More specifically, the apparatus is a portable receptor carrying the necessary drivers and stored fluids, where upon receipt of the appropriate control signal(s), selectively dispenses the stored fluids onto the surface of the receptor.

The receptor comprises a plurality of layers, e.g., a reservoir layer, a distribution layer and a receptor surface layer. The reservoir layer carries one or more reservoirs filled with one or more types of fluids. The reservoir layer is bonded to the distribution layer that contains channels and EHD micropumps for directing the fluids from the reservoir layer to the receptor surface layer. In turn, the receptor surface layer comprises a plurality of orifices for receiving and displaying the dispensed fluids.

BRIEF DESCRIPTION OF THE DRAWINGS

The teachings of the present invention can be readily understood by considering the following detailed description in conjunction with the accompanying drawings, in which:

FIG. 14 illustrates the fabrication of a receptor surface layer having multiple layers;

FIG. 15 illustrates a second embodiment for fabricating a receptor surface layer having multiple layers; and FIG. 16 illustrates the bonding of the distribution layer of FIG. 11 to the receptor surface layer to form the present receptor.

To facilitate understanding, identical reference numerals have been used, where possible, to designate identical elements that are common to the figures.

DETAILED DESCRIPTION

Figure 1:
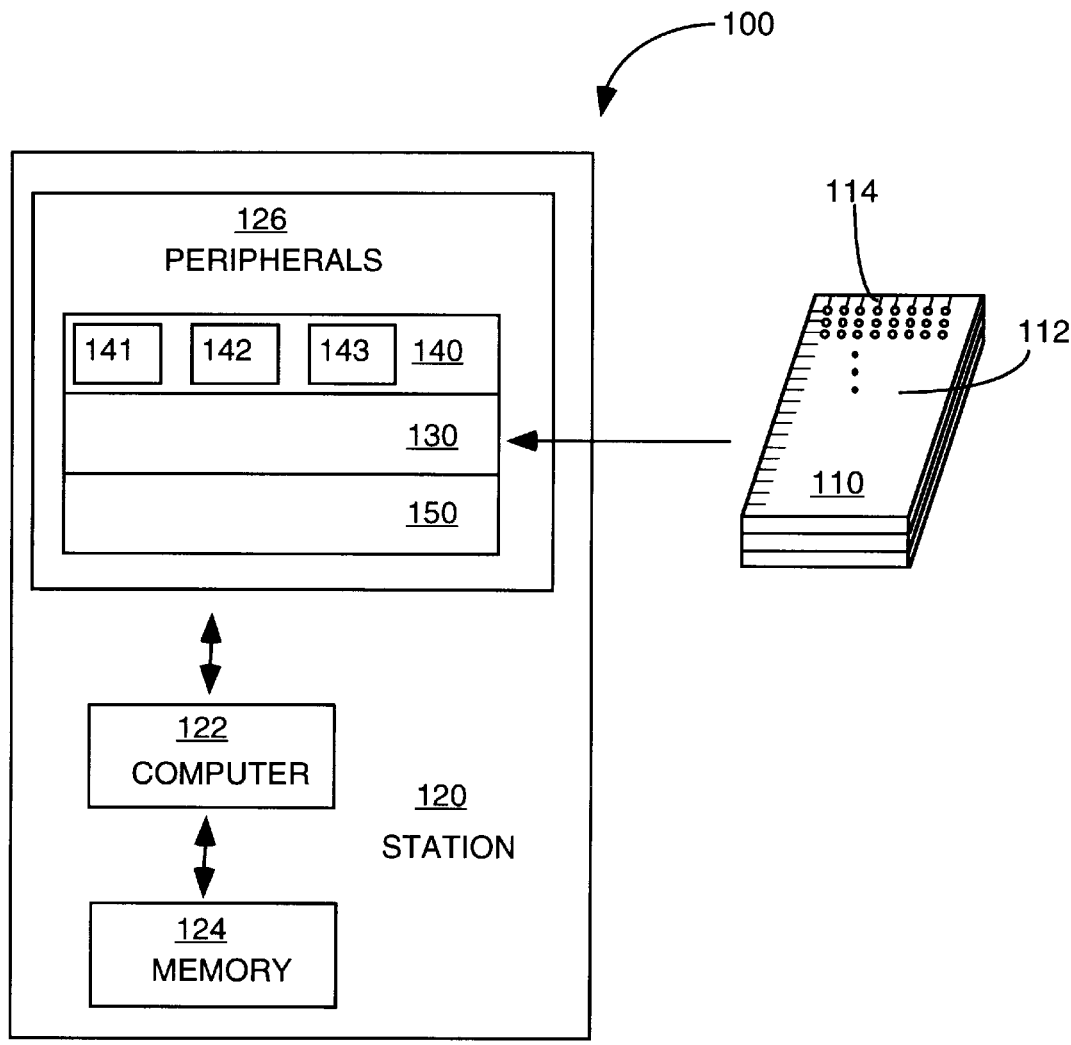
FIG. 1 depicts a system of the present invention adapted for effecting fluid delivery within a portable receptor.

FIG. 1 depicts the system 100 of the present invention adapted for effecting fluid delivery within a portable receptor. The system 100 comprises a station 120 and a portable receptor 110.

The station 120 may comprise a general purpose computer (processor, microcontroller, or ASIC) 122, a memory 124 and peripheral devices 126. The computer is electrically coupled to the memory 124 which may be loaded with one or more software applications for controlling and communicating with the portable receptor 110.

In one embodiment, the station 120 is a laboratory station comprising the following peripheral devices: a receptor support 130, detector module 140 and interface module 150. Receptor support 130 contains the necessary hardware to receive and support receptor 110, while control signals are passed to the receptor 110. The receptor support 130 further serves to support the receptor 110 under the detector module 140. Suitable receptor supports or substrate holders are commercially available.

Detector module 140 serves to detect the occurrence of a suitable reaction on the surface of the receptor 110. Detector module 140 comprises one or more light sources 141, an optical fiber 142 and one or more light detectors 143 such as a florescence detector. The optical fiber 142 is operative to transmit light from the light source 141 to the light detector 143. Specifically, the detector module 140 measures the transmittance or absorbency of material on the receptor surface 112 (an exterior surface of the receptor, e.g., a top exterior surface). The detector module 140 verifies the presence or absence of materials on the receptor surface 112 and quantifies their amounts by transmitting the measurement data to the computer 122. Suitable lasers, photodetectors and fiber optic adapters for supporting the optical fiber are all commercially available. Furthermore, various fiber optic adapters may include a lens for efficient transfer of light from the light source into the optical fiber.

Interface module 150 serves as an interface for engaging the plurality of electrical connections 114 located on the receptor 110. These electrical connections provide the necessary signals for operating a plurality of EHD micropumps (shown in FIGS. 3–5 below), which are employed to regulate the flow of fluids from the reservoirs within the receptor 110 to a location on the receptor surface 112. The interface module 150 which is electrically connected between the computer 122 and receptor 110, contains the necessary circuitry and connectors for selectively providing control signals from the computer to the EHD micropumps in the receptor 110.

To illustrate, for a particular process, the computer 122 may activate the EHD micropumps in accordance with a predefined sequence of steps where different fluids or reagents from within the receptor are sequentially or simultaneously applied to a location on the surface of the receptor 110. Various combinations of the reagents can be applied to a location on the surface of the receptor 110. In this fashion, various combinatorial processes, including syntheses, screening and chemical diagnostic assays can be accomplished on a self-contained portable receptor. In fact, the receptor surface 112 can be pretreated with any number of materials, e.g., a particular type of protein or amino acid, such that it is possible to measure the reaction or biologic activity of the pretreated material to the presence of a reagent or a sequence of different reagents as the reagents are brought to the receptor surface from within the receptor 110. Examples of other combinatorial processes that may employ the present receptor include small molecule synthesis and peptide synthesis.

Figure 2:
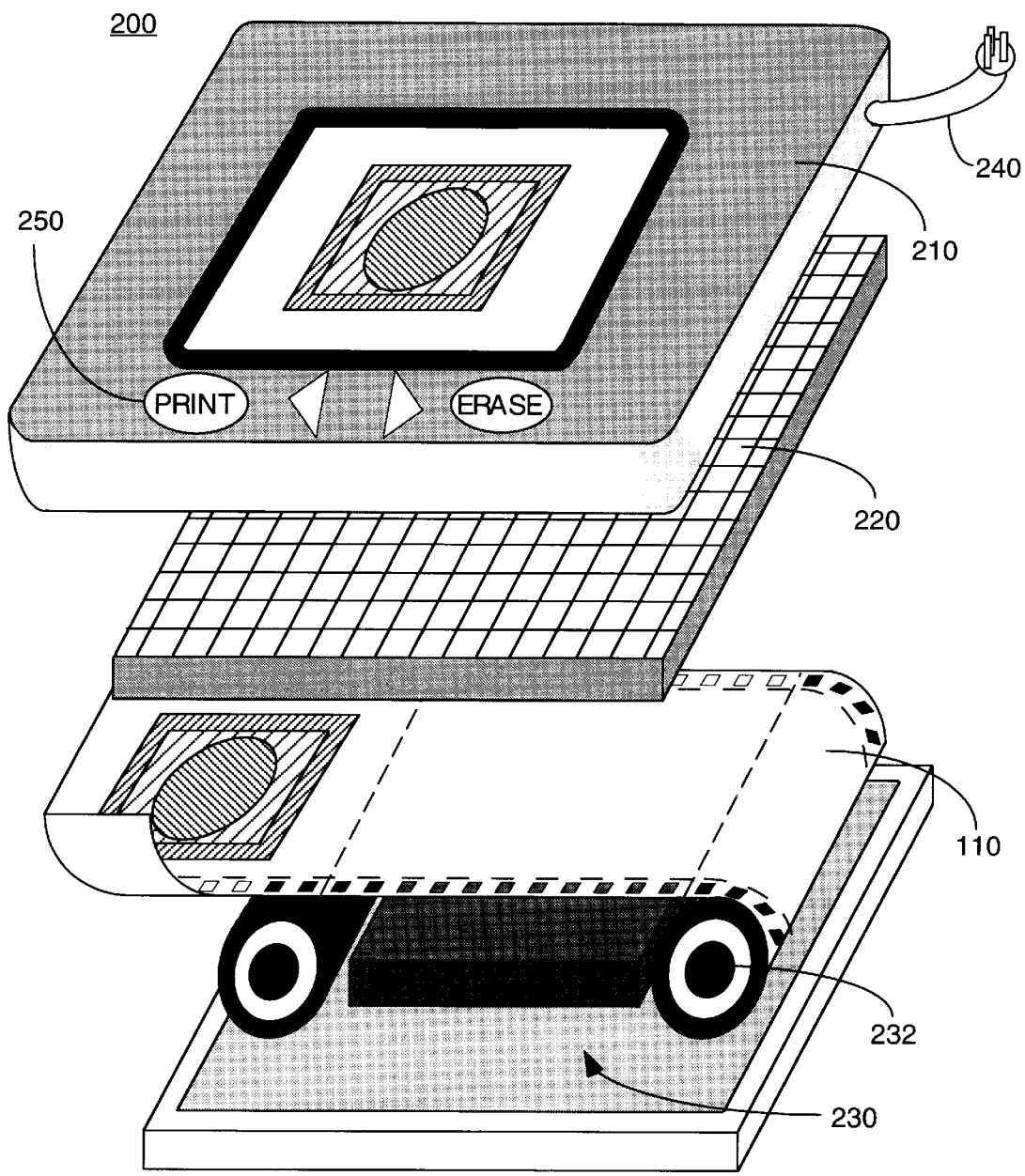
FIG. 2 illustrates a second embodiment where the station is a portable printer.

Alternatively, FIG. 2 illustrates a second embodiment where station 120 is a portable printer 200. In this embodiment, the portable printer 200 may comprise the following peripheral devices: a display (e.g., a liquid crystal display (LCD)) 210, an interface module 220, a receptor support assembly 230, an interface connector 240 and various switches 250. The portable printer 200 also incorporates a controller 122, memory 124 and a power source (e.g., batteries), which are not shown.

The interface connector 240 can be used to interface with an electronic photography device, e.g., an electronic camera. An electronic camera captures images as arrays of electrical charges using, for example, a CCD imager, and stores the images in the same way that a computer stores graphics. The stored images can be displayed on computer monitors or television screens in real time (i.e., in the field) using, for example, liquid crystal displays or (at a considerable energy penalty) small cathode-ray tubes. Based on the real-time display, the photographer can choose to keep or to erase a specific picture. The retained images are stored on computer-compatible memory devices that can be subsequently transferred to, processed by, and/or printed by computers or by a portable printer 200 as illustrated in FIG. 2.

The interface connector 240 passes the stored images from the electronic camera to the memory 124 of the portable printer 200, where the stored images can be recalled and reviewed by the user. The memory 124 in the portable printer has a suitable storage capacity to receive a plurality of stored images.

Thus, the portable printer 200 may comprise an optional display 210 which serves to display the stored images to the user. In addition, a plurality of function keys 250 are provided to allow the user to scroll forward and backward, print or erase a set of stored images.

When the user wishes to print a stored image, the control signals representative of the desired stored image are passed to the interface module 220. The interface module 220 serves the same function as discussed above for the interface module 150. Namely, interface module 220 serves as an interface for engaging the plurality of electrical connections located on the receptor 110. These electrical connections provide control signals to a plurality of EHD micropumps which are employed to regulate the flow of fluids (ink or pigment) from the reservoirs within the receptor 110 to a location on the receptor surface, thereby forming the desired stored image on the surface of the receptor 110.

Finally, FIG. 2 illustrates a receptor support assembly 230 that serves to support the receptor 110 against the interface module 220. In this embodiment, receptor support assembly 230 incorporates a pair of rollers 232 for advancing a roll of receptors with perforation. The perforation allows a "printed" receptor to be easily torn away from the roll of receptors.

The rollers also serve to apply pressure and align the receptor against the interface module 220. Alternatively, the rollers may incorporate tracking teeth or guides for engaging guide apertures along the edges of the roll of receptors. Such tracking guides allow proper alignment of the receptor 110 with the interface module 220. These tracking guides are commercially available. In addition, optional perforation can be implemented along the guide apertures so that they can be removed from the printed receptor.

However, the receptor support assembly 230 is not limited to a roller assembly implementation. In fact, the receptor support assembly 230 can be implemented using a spring loaded dispensing cartridge carrying a stack of receptors, e.g., similar to an instant film pack for instant cameras.

Figure 3:
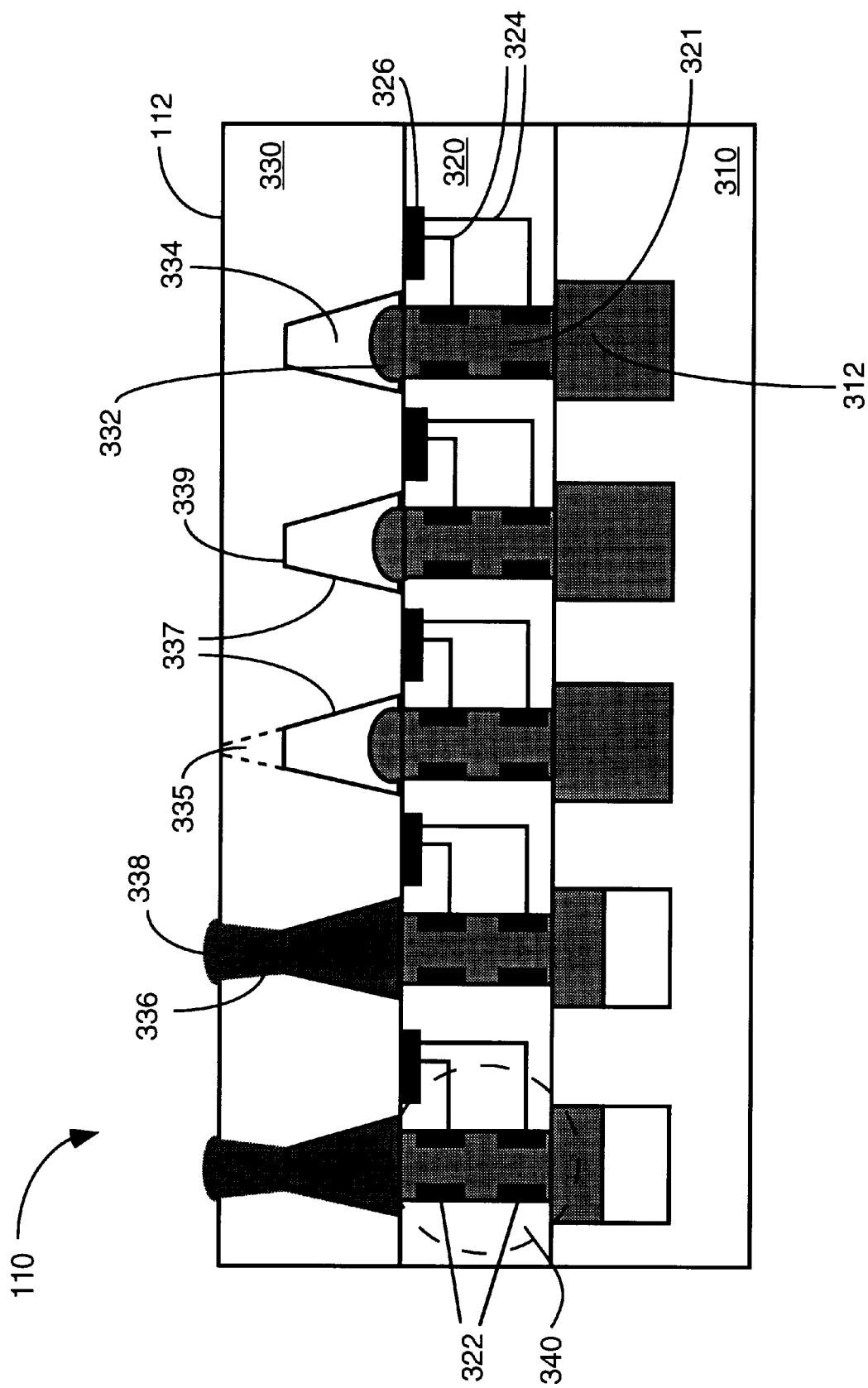
FIG. 3 illustrates a sectional view of the present receptor.

FIG. 3 depicts a sectional view of the receptor 110 of the present invention, which is a fluidic receptor having micron sized reservoirs, connecting microchannels, EHD micropumps and orifices etched into a substrate. The substrate may comprise a plurality of layers formed from different materials, e.g., "silicone elastomer" from Corning Inc., glass, silicone, plastics, fused silica and quartz.

In one embodiment, the receptor 110 comprises three distinct layers or plates. Specifically, the receptor 110 comprises a reservoir layer 310, a center distribution layer 320 and a receptor surface layer 330. The three layers are stacked vertically and coupled together to form a liquid-tight seal. In the preferred embodiment of the present invention, the various layers are bonded or fused by thermal bonding or anodic bonding or other suitable bonding techniques.

Since the layers can be made from various materials, the selection of the material for the receptor can be tailored for a particular implementation, e.g., the fluids used in combinatorial chemistry may require a different material from that of printing. To illustrate, high quality glasses such as a high melting borosilicate glass or a fused silica are preferred for their ultraviolet transmission properties for processes that may use light based technologies. Furthermore, glass possesses insulating properties, which will permit the insertion of micropump electrodes in close proximity through a distribution layer (as discussed below).

The layers of the receptor are suitably about 3 inches by 2 inches with a thickness of about one (1) to two (2) millimeters, but it should be understood that the present invention is not limited to these specific dimensions. The reservoirs, microchannels and orifices are finely and controllably etched onto the layers using traditional semiconductor techniques with a suitable chemical or laser etchant.

Alternatively, materials such as silicone elastomer can be shaped into any desired form, e.g., a thin layer or membrane. Such material is typically in an initial liquid state that can be shaped into a desired form by using custom molds.

Figure 6:
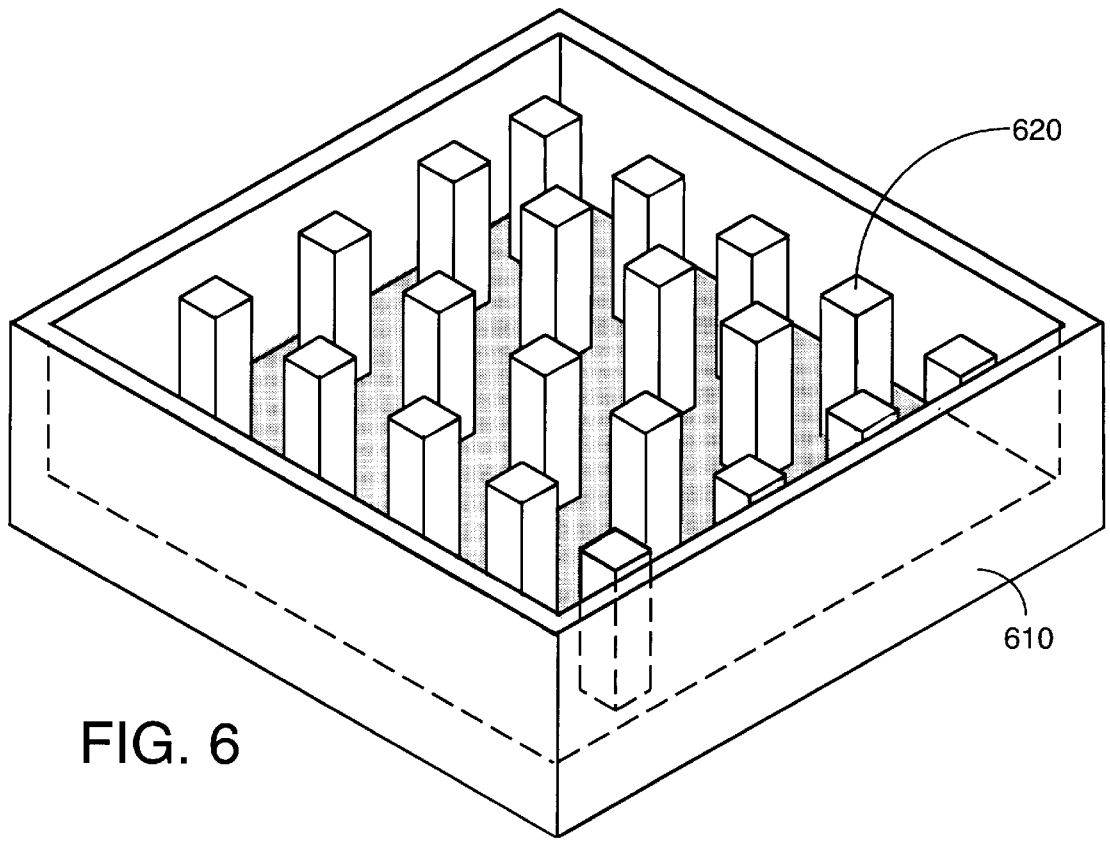
FIG. 6 illustrates a mold for forming a reservoir layer using silicone elastomer.

Returning to FIG. 3, the reservoir layer 310 comprises a plurality of prefilled reservoirs 312 carrying one or more types of fluids, e.g., fluids with different pigments (color inks) or different reagents. In one embodiment, the reservoir layer 310 is formed using a silicone elastomer (e.g., Corning "Sylgard 184") which is poured into a mold 610 as illustrated in FIG. 6. The mold contains a plurality of pillars 620, such that the pillars occupy spaces within the liquid silicone elastomer to form the reservoirs. Thus, the volume of the pillars can be designed to form reservoirs of varying sizes and shapes as required for a particular application.

Figure 7:
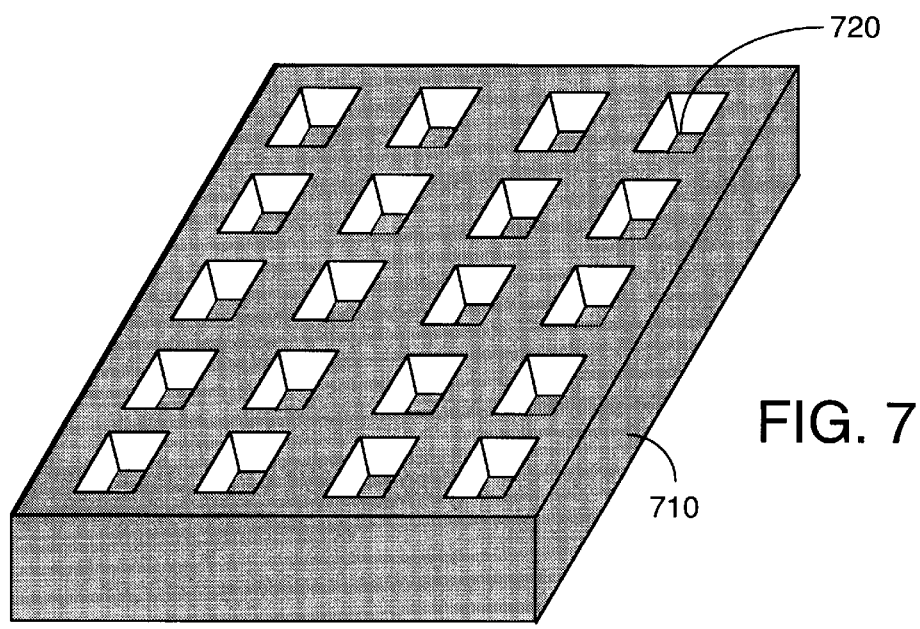
FIG. 7 illustrates a reservoir layer having a plurality of reservoirs.

The silicone elastomer is allowed to harden or cure into a reservoir layer 710 as shown in FIG. 7 having a plurality of reservoirs 720. The dimensions of the reservoirs are approximately 0.1 ul. (microliter) to 1 ul. Additionally, suitable coating, e.g., a hydrophobic seal like teflon, can be applied to the reservoirs to prevent leaching or cross contamination of fluids between reservoirs or to prevent chemical reaction of the stored fluids with the material of the reservoir layer itself.

Returning to FIG. 3, the distribution layer 320 carries a network of distribution microchannels. Although FIG. 3 illustrates a plurality of microchannels 321, that are relatively straight channels leading directly from each prefilled reservoir 312 to a location on the receptor surface layer 330, it should be understood that the distribution layer 320 may incorporate a more complex distribution microchannel system as shown below in FIG. 8.

The distribution layer 320 is made preferably from glass (e.g., Corning 7740). The techniques for etching glass are well known in the art which make glass a preferred substrate for etching a complex distribution network. Furthermore, once etched, the substrate can also be pretreated to eliminate surface adsorption of fluids, such as pigments, proteins and related bio-materials.

Referring to FIG. 3, the distribution layer 320 further comprises a plurality of micropumps or EHD micropumps 340. The miniaturized electrofluidic pumps 340 are based on electrokinetic pumps, e.g., as disclosed by Dasgupta et al., see "Electroosmosis: A Reliable Fluid Propulsion System for Flow Injection Analysis", Anal. Chem. 66, pp 1792–1798 (1994) or other suitable pumps based on microelectromechanical systems (MEMS) such as reported by Shoji et al., "Fabrication of a Micropump for Integrated Chemical Analyzing Systems", Electronics and Communications in Japan, Part 2, 70, pp 52–59 (1989). EHD micropumps are also disclosed in "A Micromachined Electrohydrodynamic EHD Pump", Sensors & Actuators 29, 159–168 (1991). The EHD micropumps 340 are disposed within channels of capillary dimension, where the EHD micropumps effect the movement of the fluids by applying an electric field to the fluids through application of a difference of potential. Electrohydrodynamics deals with fluid motion induced by electric fields.

It should be understood that the EHD phenomenon involves various forces. Thus, the term EHD micropump as used in the present invention includes micropumps that may operate under one or more forces, e.g., electrokinetic (coulomb) forces such as electrophoretic and electroosmotic forces, Kelvin polarization force, dielectric force and electrostrictive force.

More specifically, force density acting on a dielectric fluid can be expressed generally as:

$$F = qE + \vec{P} \cdot \nabla \vec{E} - \frac{1}{2}E^2 \nabla \varepsilon + \nabla \left[ \frac{1}{2} \rho \frac{\partial \varepsilon}{\partial \rho} E^2 \right] \quad (1)$$

where,
q=free space charge density
E=electric field
$\varepsilon$=permittivity
P=polarization vector
$\rho$=mass density.

Equation (1) can be viewed as comprising four (4) different forces, where:

$$qE \equiv \text{Coulomb force};$$

$$\vec{P} \cdot \nabla \vec{E} \equiv \text{Kelvin polarization force};$$

$$-\frac{1}{2}E^2 \nabla \varepsilon \equiv \text{dielectric or Korteweg-Helmholz force; and}$$

$$\nabla \left[ \frac{1}{2} \rho \frac{\partial \varepsilon}{\partial \rho} E^2 \right] \equiv \text{electrostrictive force.}$$

In general, the Coulomb force is responsible for electrophoresis and electro-osmosis. Namely, electrophoresis occurs when a coulomb force is applied to a particle or molecule that has a charge (e.g., DNA) in the bulk of the fluid. Whereas, electro-osmosis occurs when a coulomb force is applied to a charge layer formed at a solid-liquid interface, e.g., a sleeve or tube of charges along the inside surface of a microchannel.

The Kelvin polarization force generally exists where the electric field is nonuniform. As such, these nonuniformities generally exist at the edges of the electrodes, e.g., the periphery of two plates.

The dielectric or Korteweg-Helmholz force generally exists in the presence of a nonuniform medium, e.g., pigment dispersed in a fluid, while the electrostrictive force generally exists when the mass density changes, e.g., a compressible fluid. A detailed description of these forces is disclosed in *Continuum Electromechanic*, by James R. Melcher (1981) MIT Press.

Thus, the contribution from these forces can vary significantly from implementation to implementation, but micropumps operating under any of these forces are considered EHD micropumps. Furthermore, it should be understood that equation (1) only accounts for the EHD phenomenon and does not account for other factors such as fluid dynamics. Thus, those skilled in the art will realized that the present invention can be modified to account for effects from different EHD micropump configurations, different fluid characteristics and different materials used in the formation of the present EHD receptor.

To illustrate, if the micropump electrodes are separated farther apart, e.g., typically above 500 um, and the fluid has free charges, e.g., an electrolyte solution, electro-osmotic forces contribute to a greater extent in the movement of the fluid than other forces.

In contrast, if the pump electrodes are positioned closer, e.g., typically between 200–500 um, and the fluid does not have the charges, e.g., organic solvents like THF, forces acting on injected or induced charges contribute to the movement of the fluid.

Thus, since coulomb (electro-osmotic and/or electrophoretic), polarization, dielectric or electrostrictive forces are typically present to some extent, the present EHD micropump should be interpreted as electrofluidic pumps operating under one or all of these forces. Thus, depending on the behavior and composition of the fluids, suitable EHD micropumps can be selected and implemented to satisfy the requirement of a particular application that uses the present receptor.

In fact, micropumps may operate under other phenomena, other than electrohydrodynamics, e.g., "electro-wetting". A description of the electro-wetting phenomenon can be found in "Continuous Electrowetting Effect", by G. Beni et al., Appl. Phys. Lett. 40 (10), May 15, 1982 and "Dynamics Of Electrowetting Displays", by G. Beni et al., J. Appl. Phys. 52 (10), October 1981.

Figure 8:
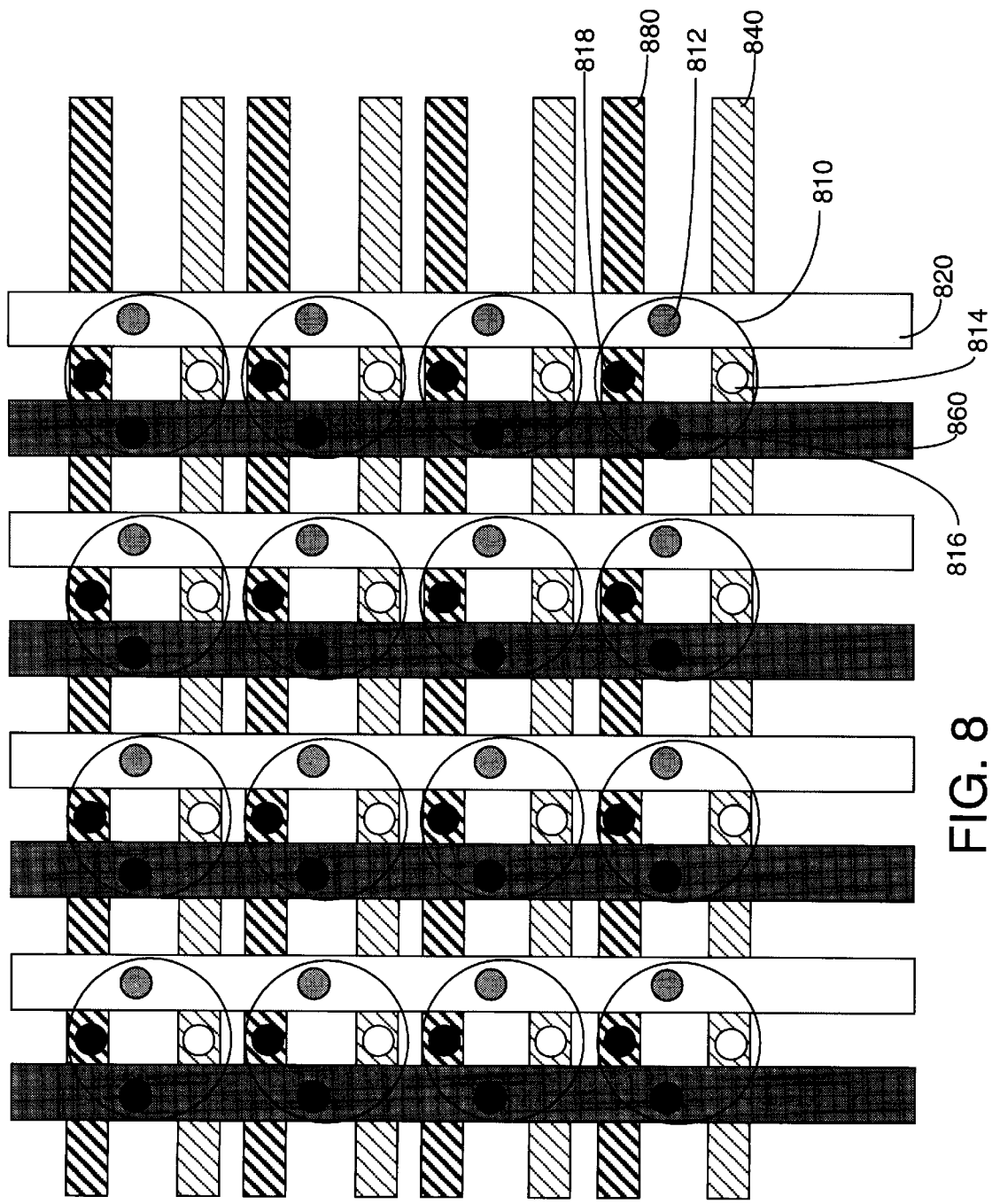
FIG. 8 illustrates a top view of a portion of the receptor surface layer having a plurality of designated surface locations.

Returning to FIG. 3, each of the electrofluidic pumps 340 comprises a set of electrodes 322. The electrodes 322 are coupled to a driver 326 via electrical contacts or connections 324. The driver 326, in turn, is electrically coupled to the interface module 150 or 220. In this manner, the computer 122 is allowed to control the activation of the electrofluidic pumps (EHD micropumps) 340 for moving the fluids in the prefilled reservoirs onto the receptor surface layer 330. In fact, if multiple prefilled reservoirs are coupled to a common location on the receptor surface layer 330 as shown in FIG. 8, then the computer 122 can direct a predefined sequence of fluids to a specific location on the receptor surface layer. This allows the receptor to form color images or to implement processes of combinatorial chemistry as discussed below.

Returning to FIG. 3, the receptor 110 further comprises a receptor surface layer or membrane 330. The receptor surface layer 330 comprises a plurality of chambers or orifices 334, which are etched (or formed using other techniques depending on the material used) onto the receptor surface layer. The opening of the chambers 334 is designed to be slightly larger than that of the microchannel 321 in the distribution layer 320. This enlargement serves as a capillary break or capillary stop to prohibit the inadvertent flow of fluids from the microchannels 321 into the chambers 334. Namely, when a fluid is within a microchannel of capillary dimension, a meniscus (concave or convex) 332 is typically formed. By employing an opening that is larger than the microchannel exit, the capillary force is sufficiently strong to stop the fluid from exiting the microchannel, thereby avoiding inadvertent discharge of fluid onto the receptor surface layer 330.

Optionally, using traditional masking technique, the sides 337 of the chambers 334 can be treated with a coating or seal. Namely, a suitable coating, e.g., a hydrophobic coating like teflon, can be applied to the sides 337 for minimizing lateral diffusion as the fluids enter the chambers 334 within the receptor surface layer 330. Lateral diffusion may cause cross contamination between different reservoir/microchannel systems or may allow a fluid to inadvertently permeate to an unintended location on the surface of the receptor surface layer 330. As illustrated in FIG. 3, the receptor surface layer 330 is comprised of a material that allows a fluid to permeate from the chamber 334 through side 339 onto the surface 112 of the receptor surface layer 330. The side 339 is not treated with the hydrophobic seal or coating.

As the fluid permeates from the chamber 334, the fluid has a tendency to disperse (illustrated as a trapezoidal pattern 336) before reaching a location on the surface 112. Illustratively, the fluid arrives on the surface 112 as a spot 338. Although the spot 338 is illustrated as a circular shape, it is not so limited. It should be understood that the composition of the receptor surface layer 330 and the shape of the chamber 334 play an important role as to how spot 338 will appear on the surface 112.

As such, it should be noted that although chamber 334 is illustrated as a "funnel-shaped" chamber, it is not so limited. The size and density (e.g., resolution in dots per inch) of the spots 338 can be manipulated by modifying chamber 334 to meet the requirement of a particular application. In fact, chamber 334 can be optionally formed such that the chamber is extended (shown as 335) all the way to the surface 112, thereby bypassing the need of a permeating region altogether.

Figure 4:
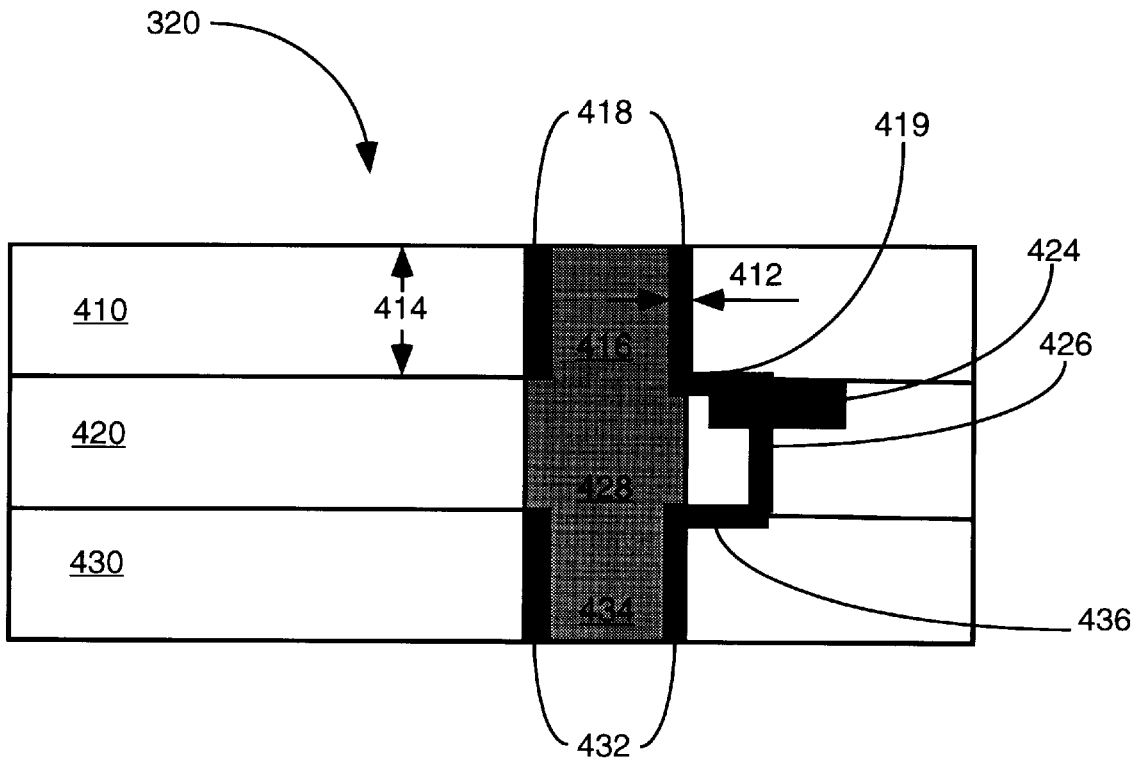
FIG. 4 illustrates a detailed embodiment of the distribution layer.

FIG. 4 illustrates a detailed embodiment of the distribution layer 320. More specifically, FIG. 4 illustrates one embodiment of the distribution layer 320 having three layers (sublayers), 410, 420 and 430. The thickness 414 of these layers can be suitably about 100–1000 um (preferably 500 um). This embodiment illustrates one method of forming the microchannels 321 and depositing the necessary EHD micropumps 340 and their associated electrical connections to form a distribution layer as illustrated in FIG. 3. Traditional masking and etching techniques are used to form the microchannels 321, the EHD micropumps 340 and their associated electrical connections (or formed using other techniques depending on the material used).

Within layer 410, a first electrode 418 is deposited along the side of a first portion 416 of the microchannel 321. The electrode 418 can be implemented in a number of different shapes and configurations.

In the preferred embodiment of the present invention, the electrode 418 consists of a conductive material deposited along the portion 416 of the microchannel, where the resulting electrode has the general shape of a ring. The diameter 412 of the ring electrode is approximately 25 to 100 um (for 100 dpi resolution) with a length of approximately 100–500 um. It should be understood that the dimension of the electrodes can be adjusted to account for various desired resolutions and the dimension of the exit orifice.

In a second embodiment, the micropump electrodes consist of an electrical conduit of electroplated gold that terminates as a "projection" (not shown). The length of the micropump electrode is about 10–30 microns with a diameter of about 50–100 microns. Thus, unlike the ring electrodes, the projection electrodes only extend from one side of the microchannel, whereas the ring electrodes are concentric with the microchannel.

In yet another embodiment, the micropump electrodes may consist of an point electrode, (like a needle with the pointed end disposed within the microchannel) and a ring electrode.

Returning to FIG. 4, the first micropump electrode 418 is coupled to an electrical contact or connection 419 located on the bottom of layer 410. This electrical connection can be deposited onto layer 410. However, it should be understood that this electrical connection 419 can also be deposited onto layer 420 instead.

Layer 420 comprises a second portion 428 of the microchannel 321 and a driver 424. The driver 424 is coupled to electrical connection 419 and is capable of receiving a control signal from the computer 122 via interface module 220 and activates the pump 340 to cause fluid to flow from the reservoir to the receptor surface layer 330. In one embodiment, the driver is implemented using thin film transistors. The deposition of thin film transistors onto a glass substrate is well known in the art. Finally, an electrical connection 426 is deposited onto layer 420, to couple the driver 424 to the second micropump electrode 432 within layer 430.

Within layer 430, a second electrode 432 is deposited along the side of a third portion 434 of the microchannel 321. The portions, 416, 428 and 432 collectively form the microchannel 321. Similar to layer 410, layer 430 includes an electrical connection 436 which is deposited on the top surface of layer 430. This electrical connection serves to couple the second electrode 432 to the driver 424. However, it should be understood that this electrical connection 436 can also be deposited onto layer 420 instead.

Figure 5:
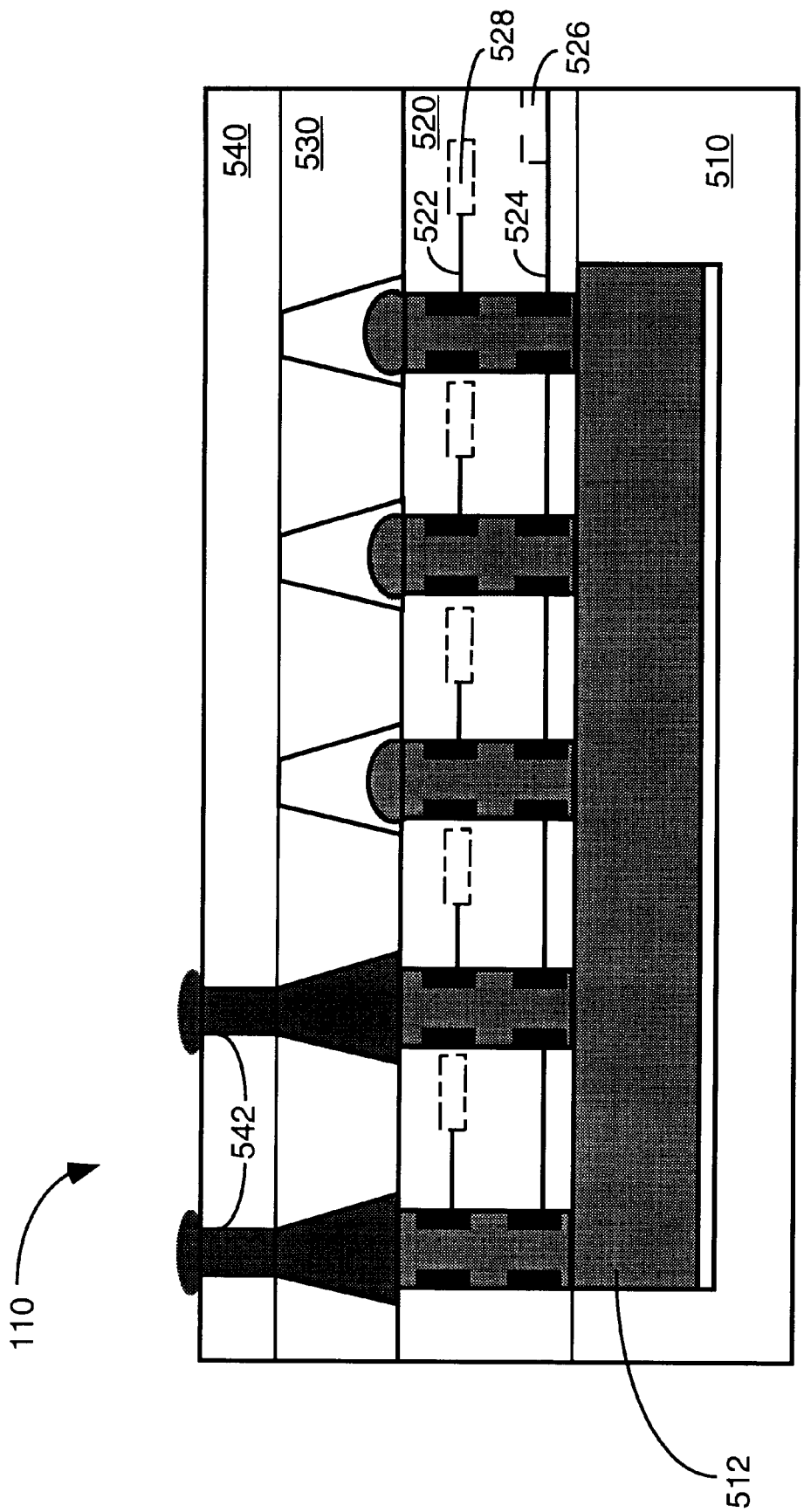
FIG. 5 illustrates various alternate embodiments of the receptor of the present invention.

FIG. 5 illustrates various alternate embodiments of the receptor 110. First, the configuration of the drivers on the receptor can be implemented using a linear array of drivers, e.g., one driver directly addressing one pump. However, for a large receptor, many drivers are needed, and arranging the drivers in a two-dimensional matrix pattern is preferable. The two-dimensional matrix of drivers can be accessed using a "grid like" interface module 220 as illustrated in FIG. 2. The driver access or connection points are located at the intersections between the vertical and horizontal lines.

However, for a large receptor (in physical size or in greater density of surface locations) numerous drivers and driver access points are required. For example, a receptor having 1000 surface locations requires 1000 drivers and 1000 driver access points. Thus, in one embodiment, the drivers 526 and 528 are implemented along the periphery of the receptor 110 as shown dashed lines. Namely, electrical connection 524 for all micropumps in a row are coupled to a single driver 526, while all micropumps in a column are coupled to a single driver 528 via electrical connection 522. It should be noted that only one micropump is illustrated per column since FIG. 5 illustrates a sectional view.

It should be noted that various methods of addressing these drivers in a matrix manner are disclosed in the patent application with Ser. No. 08/939,767 filed concurrently herewith and incorporated herein by reference. These addressing methods may include passive and active addressing.

In a second embodiment, to reduce the cost and complexity of the receptor, the drivers can be implemented on the station 120 instead of the receptor 110. Namely, the drivers can be implemented within the interface module 220, such that the drivers are only in electrical communication with the electrical connections 522 and 524 without having to be physically located on the receptor 110. This alternate embodiment reduces cost and complexity by eliminating the drivers from the receptors.

In a third embodiment, FIG. 5 illustrates a central reservoir 512. This central reservoir again reduces cost and complexity in the receptor 110. There are applications where only a single type of fluid is required to be brought to the surface of the receptor, e.g., black and white printing. Thus, it is more efficiency to simply provide a central reservoir, thereby avoiding the necessity of providing multiple reservoirs, including the necessary step of aligning the reservoirs with various microchannels.

In a fourth embodiment, an additional layer or membrane 540 is provided. This additional membrane can be implemented with a plurality of apertures with each aperture having a hydrophobic seal along its length 542. This additional layer provides an improvement in controlling cross-contamination between reservoirs and can be used in an application where accurate placement of the various fluids is extremely important.

FIG. 8 illustrates a top view of a portion of the receptor surface layer 330 having a plurality of designated surface locations 810. In this embodiment, each surface location 810 can be representative of a pixel (pixel location) in the field of printing or a reaction well (reaction location) in the field of combinatorial chemistry. Optionally, the surface location 810 can be implemented as a geographical location on a flat surface or as a well (a slight depression that can hold a quantity of fluid) on the surface.

More specifically, FIG. 8 illustrates a surface location 810 having a plurality of feeds 812, 814, 816, and 818 which serve to provide a plurality of fluids to specific locations. Although FIG. 8 illustrates four feeds, it should be understood that any number of feeds can be employed depending on the requirement of a particular application. The plurality of feeds 812, 814, 816, and 818 are coupled to a plurality of microchannels 820, 840, 860, and 880 respectively. These microchannels serve to provide fluids from a plurality of reservoirs (not shown) to a surface location 810. Again, although FIG. 8 illustrates the microchannels 820, 840, 860, and 880 as providing fluids to a plurality of surface locations, it should be understood that a plurality of dedicated reservoirs can be implemented instead for each surface location, thereby avoiding the need to provide a complex system of distribution channels as shown in FIG. 8.

FIG. 8 illustrates an important aspect of the present receptor, which is the ability to deliver a plurality of different fluids to a common location on the surface of the receptor. In the field of printing, this ability allows color images to be generated. More specifically, each of the plurality of microchannels 820, 840, 860, and 880 can supply one of three primary colors, e.g., red, green and blue (RGB) or cyan, magenta and yellow (CMY), necessary to generate the full spectrum of visible colors. The fourth microchannel can optionally provide the color black. By injecting varying degrees of the fluids carrying pigments of the primary colors, each pixel can be controlled to produce a desired color to form a color image. The amount of various fluids to be introduced into a specific location can be controlled by the micropump within each microchannel. One method to implement such accurate dispensing of small amounts of fluid is disclosed in the patent application with attorney docket SAR12564 filed concurrently herewith and incorporated herein by reference.

Similarly, in the field of combinatorial chemistry, a plurality of fluids, e.g., different reagents or different concentrations of the same reagent can be introduced to a desired location on the surface of the receptor. This capability allows numerous combinations of reagents to be performed and evaluated on a single receptor. As discussed above, a material can also be initially deposited onto the surface of the receptor to evaluate its reaction with that of the various reagents stored within the receptor. This single integrated receptor increases efficiency and portability of performing combinatorial chemistry or other processes that involve the introduction of one or more fluids to a specific location, e.g., a particular reaction cell.

FIGS. 9–16 illustrate various configurations in which the present receptor can be fabricated. Depending on a specific application, different materials may be preferred over other materials, or different materials may be more appropriate for a particular layer of the present receptor.

First, the reservoir layer can be fabricated from a number of different materials including silicone elastomer, glass, silicon and plastic. The fabrication process for silicone elastomer has been disclosed above with regard to FIGS. 6 and 7 using of a custom mold.

The reservoir layer can also be easily fabricated using glass or silicon. The techniques applied to etching and drilling these two materials are well known. Namely, to form the necessary reservoirs in the reservoir, CAD drawings and computer control movement of parts on a high precision x-y table are typically employed. Laser drilling can be used to precisely create one or more reservoirs of a predetermined dimension within the glass or silicon plate. In turn, using standard photolithography, the surface of the plate can be masked while the reservoirs can be exposed to any number of optional coatings as desired.

Finally, plastic can also be employed in the reservoir layer. A thin layer of plastic can be extruded or molded through standard methods to contain one or more reservoirs. Thus, various techniques are available to fabricate a reservoir layer from a desired material for a particular application.

Figure 9:
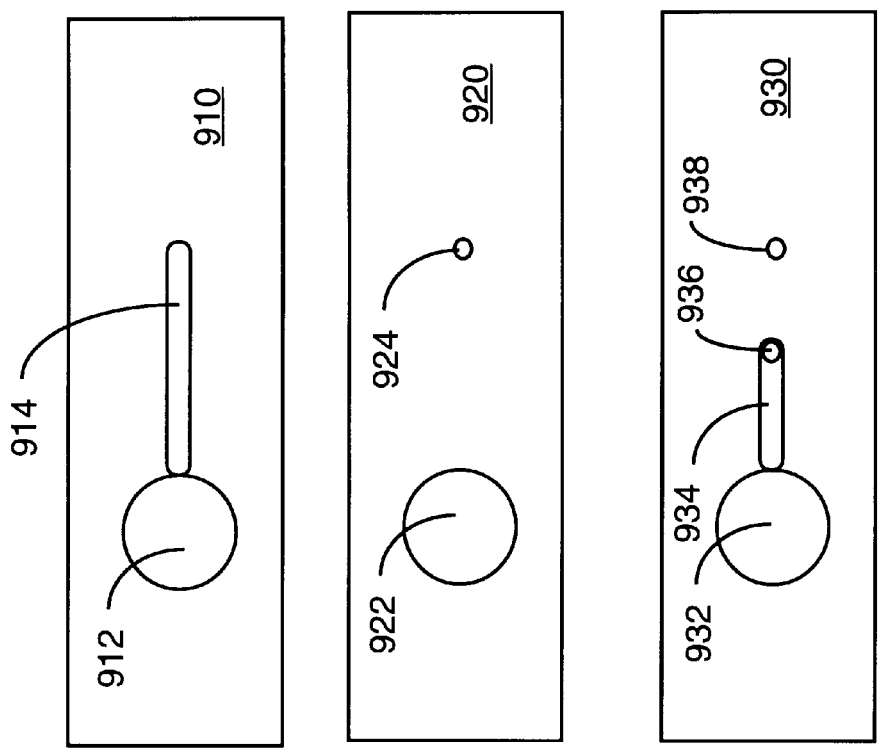
FIG. 9 illustrates the fabrication of a distribution layer having multiple layers.
Figure 9:
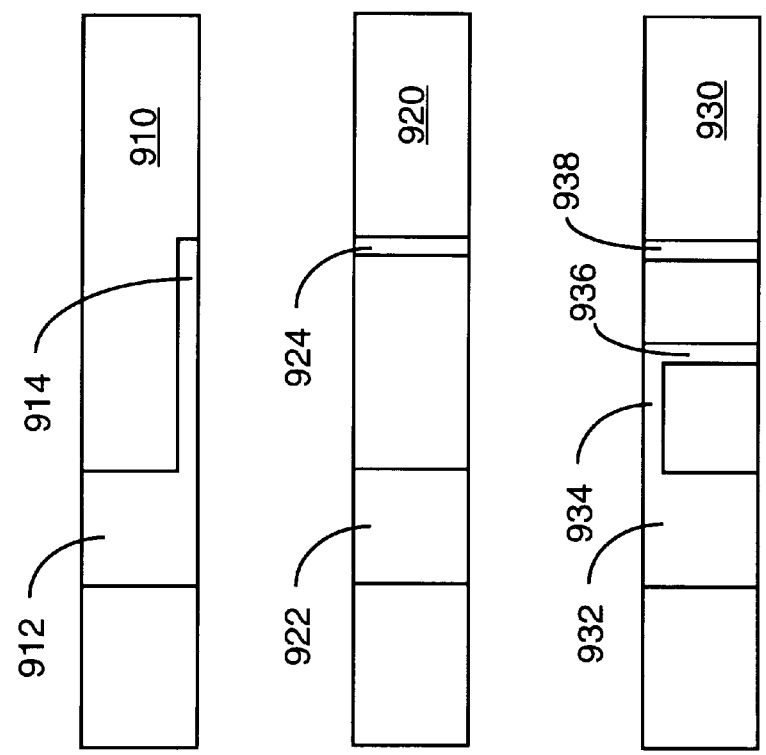

Next, FIG. 9 illustrates the fabrication of a distribution layer of the present invention having multiple sublayers, e.g., three layers 910, 920 and 930. In the preferred embodiment, the distribution layer is fabricated from glass using laser drilling (or chemical etching) to generate one or more channels or depressions for receiving a conductive material. FIG. 9 illustrates sectional views of these sublayers to reveal the locations of the channels and/or depressions for each sublayer. FIG. 9 also provides a top or bottom view next to each of the sectional view to provide clarity for the following description.

Referring to FIG. 9, a channel (or hole) 912 and depression 914 are drilled or etched onto a first layer 910. Channel 912 serves as a portion of the microchannel to deliver fluids and to receive one of the electrode of the EHD micropump. A bottom view is provided to illustrate the depression 914 which is employed to hold a conduct material to electrically couple the electrode that is destined to reside in the channel 912.

Similarly, two channels 922 and 924 are drilled into a second sublayer 920. Channel 922 also serves as a portion of the microchannel to deliver fluids, while channel 924 serves to receive a conductive material to electrically engage the depression 914 in sublayer 910. A top view is provided to further clarify the configuration of these two channels.

A third sublayer 930 receives three channels 932, 936, and 938 and one depression 934. Channel 932 also serves as a portion of the microchannel to deliver fluids and to receive the other electrode of the EHD micropump. Channel 934 and depression 936 are employed to receive a conductive material to electrically engage the electrode that is destined to reside in the channel 932. Finally, channel 938 is employed to receive a conductive material to electrically engage the channel 924 in sublayer 920. Again, a top view is provided to further clarify the configuration of these channels and depression.

Figure 10:
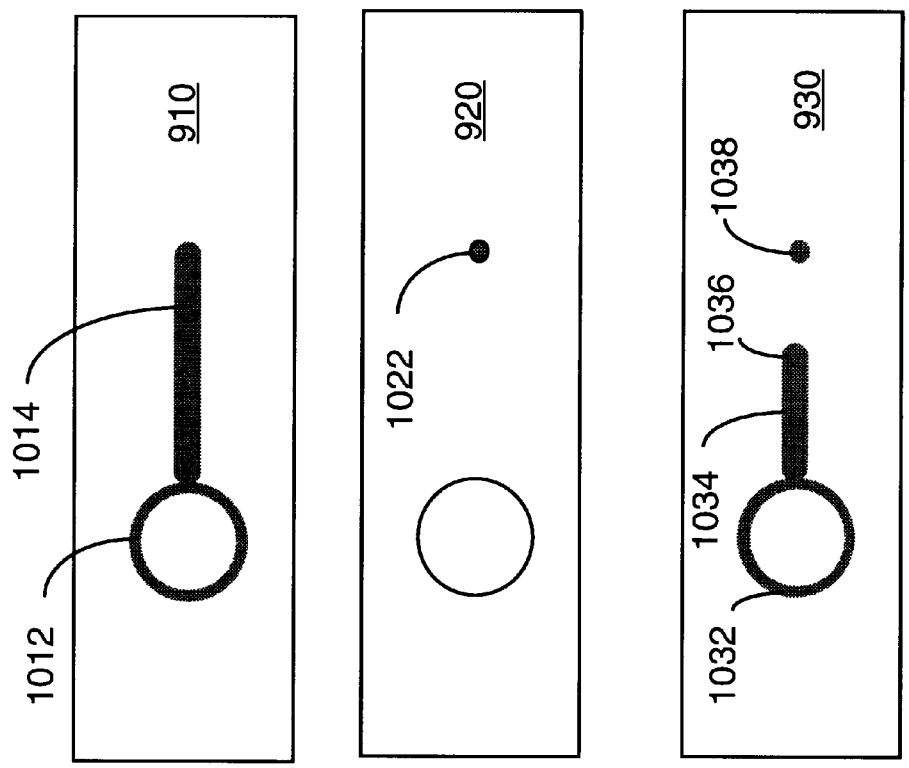
FIG. 10 illustrates the fabrication of a micropump within the distribution layer illustrated in FIG. 9.
Figure 10:
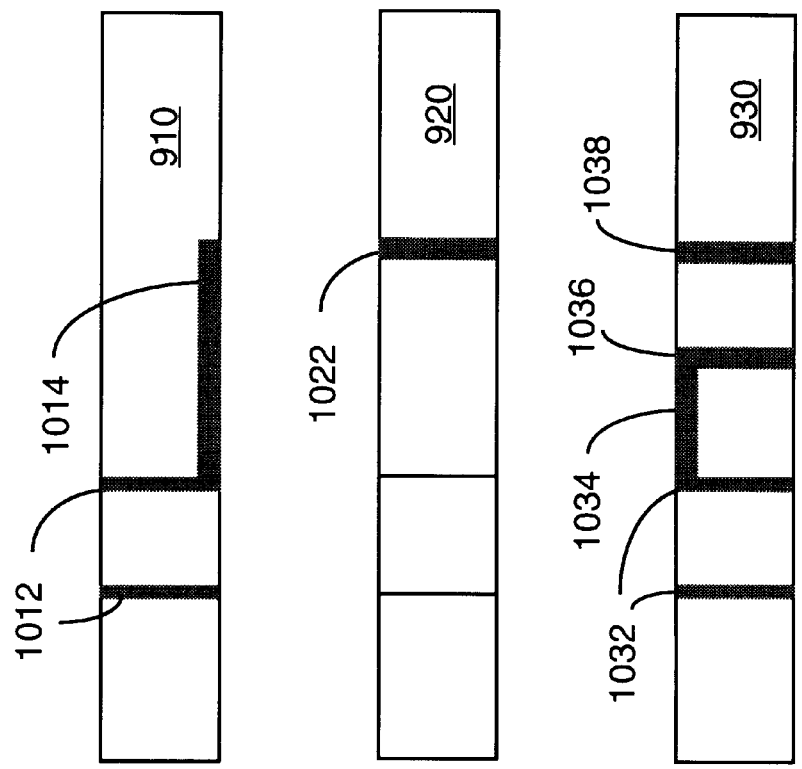

FIG. 10 illustrates the fabrication of a micropump within the distribution layer illustrated in FIG. 9. More specifically, shaded areas on the sublayers indicate the deposition of a conductive material, i.e., formation of electrodes and electrical connections through electroless plating or electro plating. In brief, the mask used to define the channels and depressions can be left in place, while a thin film metal is deposited into the desired areas, followed by electroplating metal several microns-thick, and then the mask is removed. A recessed structure enables a planar contact without interfering with the permanent bonding of layers or plates.

Alternatively, solder bumps and solder reflow techniques can be used instead of thin-film deposition and electroplating to form planar metal contact or connections. Alternatively, conductive silicon can be used in place of metal.

Returning to FIG. 10, under the electroplating process, first sublayer 910 receives a first ring electrode 1012 and electrical connection 1014. Second sublayer 920 receives electrical connection 1022, while sublayer 930 receives a second ring electrode 1032 and electrical connections 1034, 1036, and 1038. Again, a bottom or top view is provided for each respective sublayer.

Figure 11:
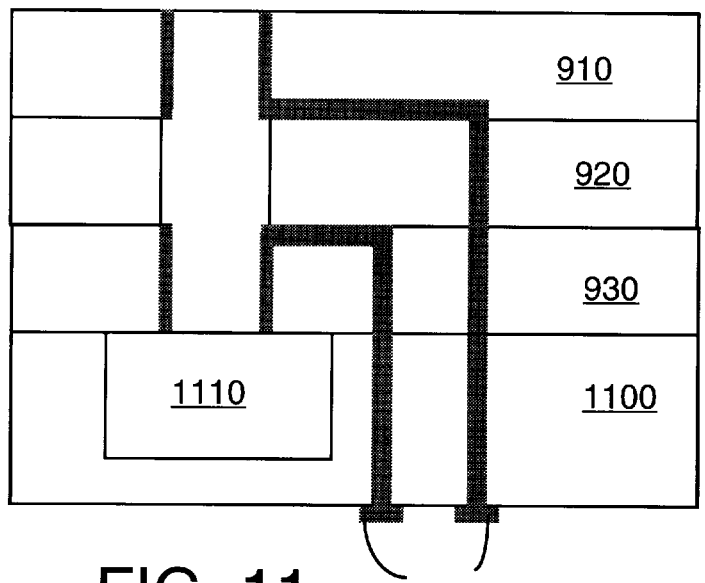
FIG. 11 illustrates the bonding of the distribution layer of FIG. 10 to a reservoir layer.

FIG. 11 illustrates the bonding of the distribution layer of FIG. 10 to a reservoir layer 1100. Bonding of these sublayers can be achieved through anodic bonding techniques. The three sublayers of the distribution layer are assembled together with a reservoir layer 1100. The reservoir layer contains a pair of electrical connections that are coupled to the sublayer 930 to allow a pair of contacts 1120 to be electrically coupled to electrodes 1012 and 1032. Using these contacts 1120 via an interface module, the EHD micropump on the distribution layer can be activated to dispense fluid from the reservoir 1110.

Figure 12:
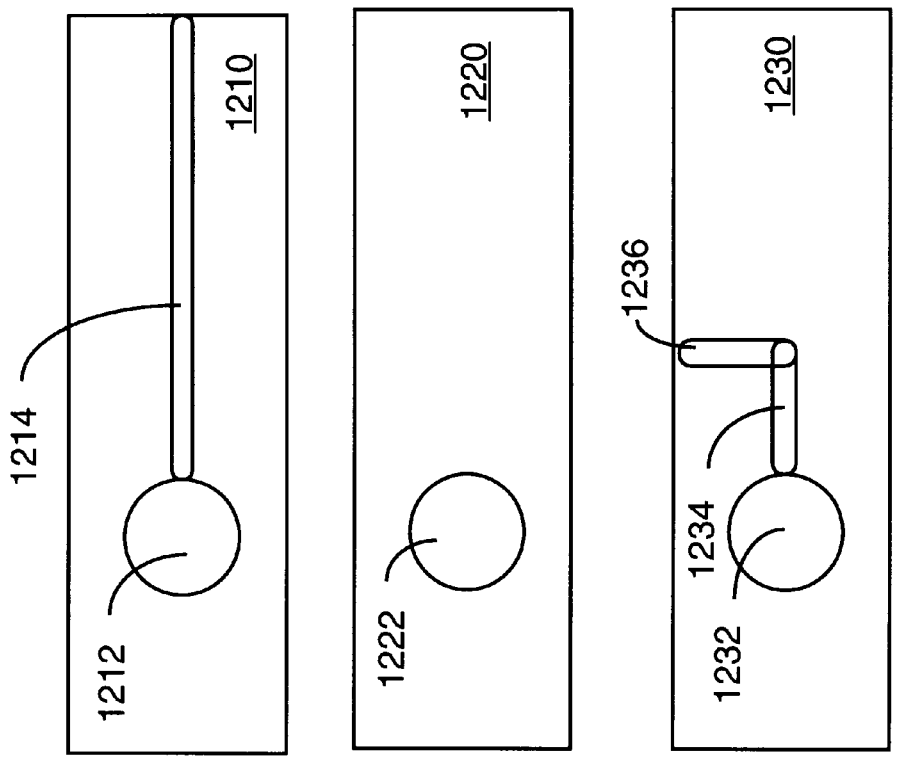
FIG. 12 illustrates a second embodiment for fabricating a distribution layer having multiple layers.
Figure 12:
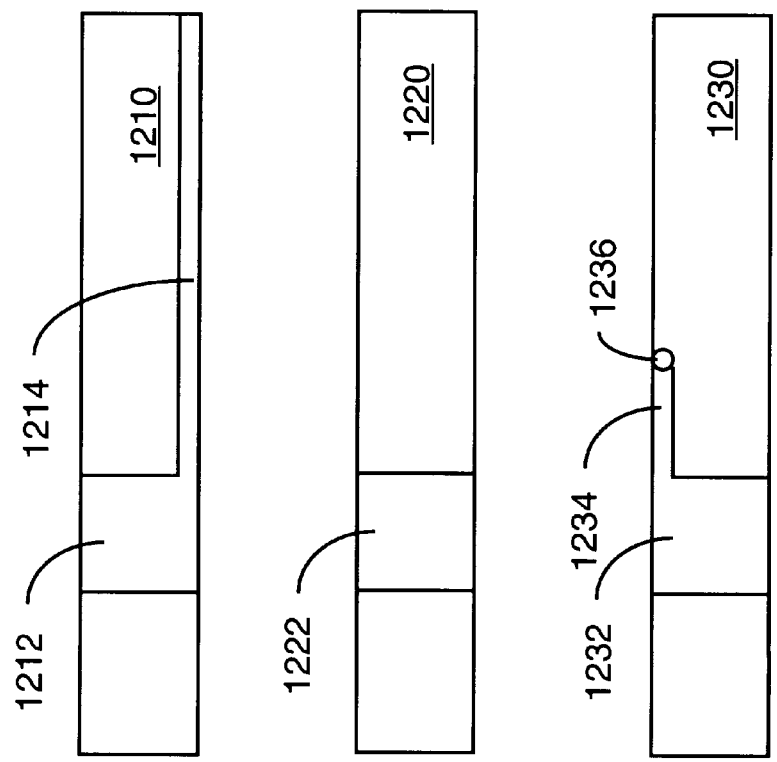

FIG. 12 illustrates a second embodiment for fabricating a distribution layer having multiple layers. Namely, FIG. 12 illustrates an embodiment where the contacts for the EHD micropumps are situated at the periphery of the distribution layer, instead of being situated on one side of the reservoir layer.

More specifically, a channel 1212 and depression 1214 are drilled onto a first layer 1210. Channel 1212 serves as a portion of the microchannel to deliver fluids and to receive one of the electrode of the EHD micropump. A bottom view is provided to illustrate the depression 1214 which is employed to hold a conduct material to electrically couple the electrode that is destined to reside in the channel 1212. It should be noted that depression 1214 extends to one side of sublayer 1210.

In turn, a single channel 1222 is drilled into a second sublayer 1220. Channel 1222 also serves as a portion of the microchannel to deliver fluids. A top view is provided to clarify the configuration of this channel.

A third sublayer 1230 receives one channel 1232 and two depressions 1234 and 1236. Channel 1230 also serves as a portion of the microchannel to deliver fluids and to receive the other electrode of the EHD micropump. Depressions 1234 and 1236 are employed to receive a conductive material to electrically engage the electrode that is destined to reside in the channel 1232. A top view is provided to further clarify the configuration of these channel and depressions. Again, it should be noted that depression 1236 extends to one side of sublayer 1230.

Figure 13:
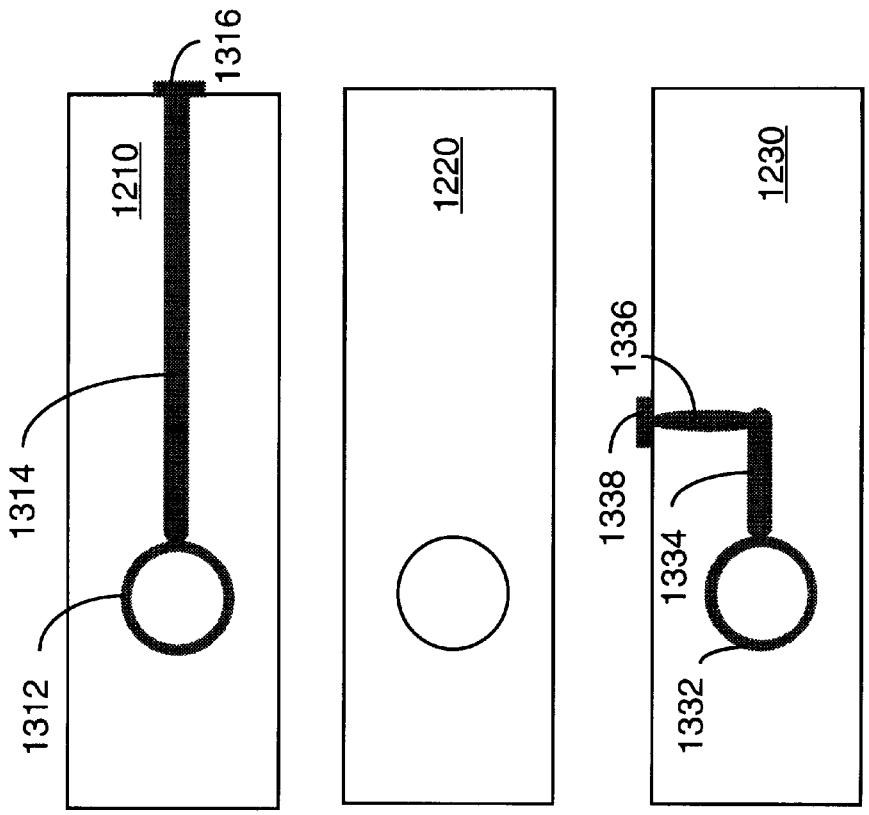
FIG. 13 illustrates the fabrication of a micropump within the distribution layer illustrated in FIG. 12.
Figure 13:
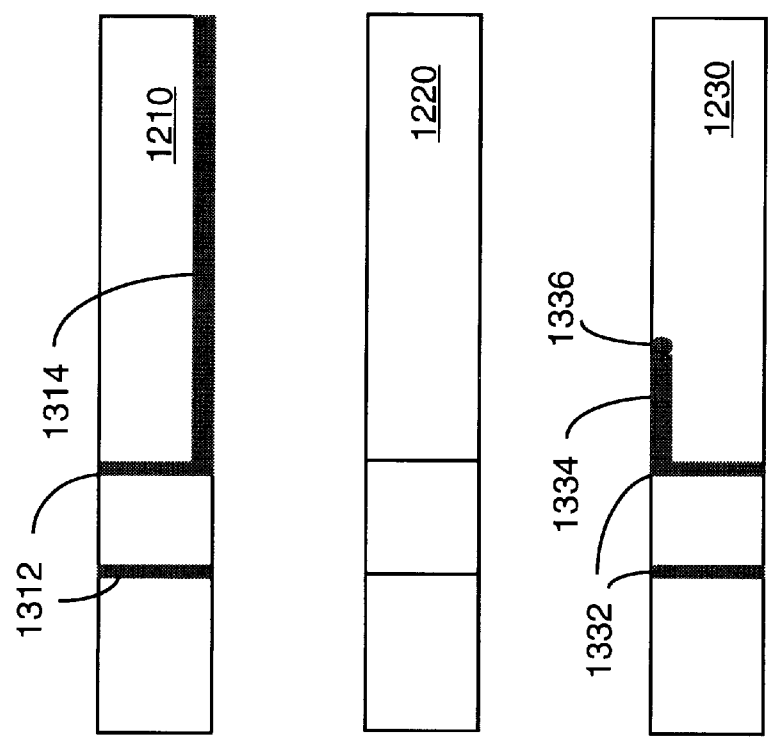

FIG. 13 illustrates the fabrication of a micropump within the distribution layer illustrated in FIG. 12. More specifically, shaded areas on the sublayers indicate the deposition of a conductive material, i.e., formation of electrodes and electrical connections through electroless plating or electro plating. Under the electroplating process, first sublayer 1210 receives a first ring electrode 1312 and electrical connection 1314. Second sublayer 1220 does not receive any electrical connection, while sublayer 1230 receives a second ring electrode 1332 and electrical connections 1334 and 1336.

A bottom or top view is provided for each respective sublayer in FIG. 13. FIG. 13 also illustrates electrical contacts 1316 and 1338 disposed along the periphery of the distribution layer. This embodiment allows the EHD micropumps of the present receptor to be addressed in a matrix fashion. Namely, the electrical contacts 1316 and 1338 are located on two sides of the distribution layer and resemble those contacts 114 as shown in FIG. 1. This configuration significantly reduces the number of drivers that are needed to operate the present receptor.

FIG. 14 illustrates the fabrication of a receptor surface layer having multiple layers 1410, 1420 and 1430. In the preferred embodiment, the receptor surface layer is fabricated using a combination of hydrophilic and hydrophobic membranes and coatings.

More specifically, sublayer 1430 can be fabricated from a hydrophobic membrane having a laser drilled chamber or orifice 1432 for receiving the fluid from the microchannel. Examples of hydrophobic membranes include "PTFE" polytetra fluoroethylene from Gelman Sciences. The hydrophobic sublayer 1430 receives the fluid from the microchannel and directs the fluid flow to a location on the receptor surface. The hydrophobic sublayer 1430 is employed to safeguard against lateral diffusion of the fluids as the fluids are dispensed from the reservoirs.

In turn, a sublayer 1420 can be fabricated from a hydrophilic membrane to capture and retain the fluid for display and/or analysis purposes. Examples of a hydrophilic membrane includes "Versapor" acrylic copolymer or "Glass Fiber Media" borosilicate glass, both from Gelman Sciences. Finally, these various sublayers can be bonded together by using RF, heat, or ultrasonic sealing as suggested by Gelman Sciences.

An optional hydrophobic coating 1410 can be applied to the surface of the present receptor. This coating serves to prevent smearing of the fluids at the receptor surface. A large number of materials exist that can be used to control the wettability of surfaces, where the selection of a particular hydrophobic coating is dictated by the requirements of a particular application for the present receptor. These materials vary in cost, efficacy, permanency, and chemical nature. When the specific objective is to render a surface hydrophobic (water-repelling), the choices may include fluorocarbon polymer, surface-polymerized fluoropolymers, surface-polymerized silicones, surface-applied silicones and certain oils.

Fluorocarbon polymer (Teflon FTE or FEP) coatings are generally expensive, but it is also very durable. Fluorocarbon polymer is typically supplied as dispersions or solutions of high molecular weight polymers in carriers or solvents that deposit dusty coatings, which must be sintered under heat and/or pressure.

Surface-polymerized fluoropolymers are generally applied directly on surfaces by ultraviolet- or plasma-initiated polymerization of gaseous fluorocarbon monomers at low pressure (e.g., a few mT (millitorr) to a few Torrs). Surface-polymerized fluoropolymers have lower molecular weight than pre-made polymers (as discussed above) and are generally less robust against scratches, abrasion, and dissolution.

Surface-polymerized silicones are generally applied from an organic-solvent solution and cured at intermediate temperatures (e.g., a few hundred C). These materials are able to withstand considerable temperature, but they are still less robust than Teflon coatings and may react with some chemicals.

Surface-applied silicones are generally applied like silane adhesion promoters, but they have the opposite physical effect. These materials bond well to highly polar surfaces (especially glass) at room temperature. Other advantages of surface-applied silicones include the availability of this material in a wide range of types and a lower cost as compared to bonded silicones. However, these materials cannot withstand high temperatures and they can be easily removed by solvents or repeated washings.

Finally, various waxes and oils can also serve as hydrophobic coatings. These materials are generally inexpensive, but their durability is limited.

FIG. 15 illustrates an alternate embodiment for fabricating a receptor surface layer having multiple layers, 1510, 1520 and 1530. In this embodiment, sublayer 1530 is fabricated from glass instead of a hydrophobic membrane. However, the laser drilled or chemically etched chamber or orifice 1532 is coated with a hydrophobic coating similar to that employed in sublayer 1510. This embodiment provides an alternative for applications where implementing a hydrophobic membrane is not desirable.

Finally, FIG. 16 illustrates the bonding of the distribution layer of FIG. 11 with the receptor surface layer of FIG. 14 to form one embodiment of the present receptor. In sum, sublayers 1630–1634 form a receptor surface layer 330 and sublayers 1620–1624 form a distribution layer 320. Finally, a single reservoir layer 1610 having a reservoir 1612 and electrical contacts 1614 comprises the last layer of the present EHD receptor. It should be noted that although FIGS. 9–16 only illustrate a single reservoir, a single microchannel, and a single EHD micropump, the present invention is not so limited. Any number of reservoirs, microchannels, layers, sublayers and EHD micropumps can be employed to address the requirement of a particular implementation.

Furthermore, loading fluids into the present EHD receptor can be accomplished by using another distribution plate that is designed to load fluids into the receptor in a particular manner. Namely, a loading distribution plate can be temporarily set on top of the reservoir layer or the distribution layer to channel fluids from a fluid loading machine into the reservoirs of the receptor. Such fluid loading machine resembles a laboratory station as discussed above.

It is to be understood that the apparatus and method of operation taught herein are illustrative of the invention. Modifications may readily be devised by those skilled in the art without departing from the spirit or scope of the invention.

What is claimed is:

1. A receptor comprising:

a substrate having an exterior surface;

a reservoir in said substrate carrying a stored fluid;

a microchannel in said substrate having a first end coupled to said reservoir and a second end coupled to said exterior of said substrate; and an electrohydrodynamic (EHD) micropump having a pair of electrodes coupled to said microchannel so that responsive to a control signal said stored fluid will flow to a location on the exterior surface of the substrate.

2. The receptor of claim 1, wherein both of said reservoir and said microchannel carry said stored fluid.

3. The receptor of claim 1, wherein said substrate comprises a plurality of layers.

4. The receptor of claim 3, wherein said reservoir is located on a first layer of said substrate, wherein said microchannel is located on a second layer has and wherein the exterior surface of the receptor is located on a third layer of said substrate.

5. The receptor of claim 4, wherein said first layer is formed from a silicone elastomer material.

6. The receptor of claim 4, wherein said second layer is formed from glass.

7. The receptor of claim 4, wherein said third layer contains a chamber for receiving said stored fluid.

8. The receptor of claim 7, wherein said chamber extends to the exterior surface of the receptor.

9. The receptor of claim 7, wherein said chamber is coated with a hydrophobic coating.

10. The receptor of claim 9, wherein said EHD micropump comprises a set of ring electrodes.

11. The receptor of claim 10, wherein said second layer comprises a plurality of sublayers, wherein each of said ring electrodes is disposed on one of said sublayers.

12. The receptor of claim 4, wherein said EHD micropump is disposed within said second layer.

13. The receptor of claim 1, wherein said stored fluid is prefilled and sealed within the receptor.

14. The receptor of claim 1, further comprising:
    a driver, coupled to said EHD micropump, for receiving said control signal to cause said fluid to flow.

15. A receptor comprising:
    a substrate;
    a plurality of reservoirs in said substrate carrying one or more types of stored fluids;
    one or more microchannels each coupled at a first end to one of said plurality of reservoirs and each coupled at a second end to a surface of said substrate; and
    a plurality of electrohydrodynamic (EHD) micropumps, where each of said plurality of EHD micropumps has a pair of electrodes coupled to one of said microchannels so that responsive to one or more control signals, one or more types of said stored fluids will flow to a specific location on the surface of the substrate.

16. The receptor of claim 15, wherein said specific location comprises a pixel location.

17. The receptor of claim 15, wherein said specific location comprises a reaction location.

18. The receptor of claim 15, wherein the substrate comprises a plurality of layers.

19. The receptor of claim 15, further comprising:
    a plurality of drivers for receiving said control signals to cause said fluids to flow, where said electrohydrodynamic (EHD) micropumps are arranged in a matrix configuration having rows and columns, where each of said drivers is coupled to one of said rows or one of said columns of said electrohydrodynamic (EHD) micropumps.

20. A method of fabricating a receptor, said method comprising the steps of:
    (a) forming a reservoir on a substrate for storing a fluid;
    (b) forming on said substrate a microchannel coupled at a first end to said reservoir and coupled at a second end to a surface of said substrate; and
    (c) forming an electrohydrodynamic (EHD) micropump having a pair of electrodes coupled to said microchannel so that responsive to a control signal, said stored fluid with flow to a specific location on the surface of the substrate.

21. The method of claim 20, wherein said substrate comprises a plurality of layers.

22. The method of claim 21, wherein said reservoir is located on a first layer, wherein said microchannel is located on a second layer and wherein said surface of the substrate is located on a third layer.

23. The method of claim 22, wherein said first layer is formed from a silicone elastomer material.

24. The method of claim 22 wherein said second layer is formed from glass.

25. The method of claim 20, wherein said stored fluid is sealed within the receptor.

26. A system for moving fluids, said system comprising:
    a receptor having a reservoir in a substrate;
    a microchannel coupled at a first end to said reservoir and coupled at a second end coupled to an exterior surface of said substrate;
    an electrohydrodynamic (EHD) micropump having a pair of electrodes coupled to said microchannel; and
    a station coupled to said receptor, where said station sends a control signal to said EHD micropump, where said EHD micropump, responsive to said control signal, causes a stored fluid in said reservoir to flow to a location on said exterior surface of the substrate.

27. The system of claim 26, wherein said station is a printer.

28. The system of claim 26, wherein said station is a laboratory station.

* * * * *